US006939940B2

(12) United States Patent
Dingemans et al.

(10) Patent No.: US 6,939,940 B2
(45) Date of Patent: Sep. 6, 2005

(54) LIQUID CRYSTALLINE THERMOSETS FROM ESTER, ESTER-IMIDE, AND ESTER-AMIDE OLIGOMERS

(75) Inventors: Theodorous J. Dingemans, Hampton, VA (US); Erik S. Weiser, Newport News, VA (US); Terry L. St. Clair, Poquoson, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/757,398

(22) Filed: Jan. 5, 2001

(65) Prior Publication Data

US 2002/0132933 A1 Sep. 19, 2002

Related U.S. Application Data

(60) Provisional application No. 60/232,504, filed on Sep. 13, 2000.

(51) Int. Cl.$^7$ .......................... C08G 73/06; C09K 19/06
(52) U.S. Cl. ...................... 528/170; 528/208; 528/210; 528/211; 252/299.6; 252/299.62; 252/299.64; 252/299.67
(58) Field of Search ................................ 528/170, 208, 528/210, 211; 252/299.61, 299.62, 299.64, 299.67, 299.6, 299.63

(56) References Cited

U.S. PATENT DOCUMENTS

| | | | |
|---|---|---|---|
| 3,778,410 A | 12/1973 | Kuhfuss et al. | |
| 3,804,805 A | 4/1974 | Kuhfuss et al. | |
| 3,839,287 A | 10/1974 | Kwitakowski et al. | |
| 3,864,309 A | 2/1975 | Bilow et al. | |
| 3,975,444 A | 8/1976 | Kovar et al. | |
| 4,067,852 A | 1/1978 | Calundann | |
| 4,083,829 A | 4/1978 | Calundann et al. | |
| 4,161,470 A | 7/1979 | Calundann | |
| 4,225,497 A | 9/1980 | Baudouin et al. | |
| 4,267,289 A | 5/1981 | Froix | |
| 4,351,918 A | 9/1982 | Charbonneau et al. | |
| 4,513,131 A | 4/1985 | Reinhardt et al. | |
| 4,550,177 A | 10/1985 | Kumar et al. | |
| 4,581,399 A | 4/1986 | Yoon | |
| 4,654,412 A | 3/1987 | Calundann et al. | |
| 4,661,604 A | 4/1987 | Lubowitz et al. | |
| 4,684,714 A | 8/1987 | Lubowitz et al. | |
| 4,710,547 A | 12/1987 | Uryu et al. | |
| 4,739,030 A | 4/1988 | Lubowitz et al. | |
| 4,746,694 A | 5/1988 | Charbonneau et al. | |
| 4,762,906 A | 8/1988 | Hisgen et al. | |
| 4,851,495 A | 7/1989 | Sheppard et al. | |
| 4,851,501 A | 7/1989 | Lubowitz et al. | |
| 5,068,308 A | 11/1991 | Pipper et al. | |
| 5,092,890 A | 3/1992 | Pohlemann et al. | |
| 5,114,612 A | * | 5/1992 | Benicewicz ............ 252/299.01 |
| 5,198,551 A | 3/1993 | Benicewicz et al. | |
| 5,216,073 A | 6/1993 | Haider et al. | |
| 5,237,004 A | 8/1993 | Wu et al. | |
| 5,241,037 A | * | 8/1993 | Choi ........................... 528/185 |
| 5,315,011 A | * | 5/1994 | Benicewicz .................. 548/521 |
| 5,319,064 A | 6/1994 | McCarthy et al. | |
| 5,418,209 A | 5/1995 | Hiroi et al. | |
| 5,475,133 A | 12/1995 | Douglas et al. | |
| 5,491,201 A | 2/1996 | Hefner, Jr. et al. | |
| 5,550,204 A | 8/1996 | Lubowitz et al. | |
| 5,575,949 A | 11/1996 | Benicewicz et al. | |
| 5,688,895 A | 11/1997 | Plotzker et al. | |
| 5,843,541 A | 12/1998 | Alanko et al. | |
| 5,889,077 A | 3/1999 | Fuller et al. | |

FOREIGN PATENT DOCUMENTS

DE 197 49 123 A 1 5/1999
WO WO 99/24529 5/1999

OTHER PUBLICATIONS

P.M. Hergnerother, R.G. Bryant, B.J. Jensen, & S.J. Havens, "Journal of Polymer Science," Phenylethynyl–Terminated Imide Oligomers and Polymers Therefrom, John Wiley & Sons, Inc., p. 3061–3067, vol. 32, (1994).

Chun–Shan Wang & Hann–Jang Hwang, "Journal of Polymer Science," Investigation of Bismaleimide Containing Naphthalene Unit II Thermal Behavior and Properties of Polymer, John Wiley & Sons, Inc., p. 1493–1500, vol. 34, 1996.

Andrea E. Hoyt & Brian C. Benicewicz, "Journal of Polymer Science," Rigid Rod Molecules as Liquid Crystal Thermosets. II. Rigid Rod Esters, John Wiley & Sons, Inc., p. 3417–3427, vol. 28, (1990).

(Continued)

Primary Examiner—Jeffrey B. Robertson
(74) Attorney, Agent, or Firm—Robin W. Edwards

(57) ABSTRACT

Main chain thermotropic liquid crystal esters, ester-imides, and ester-amides were prepared from AA, BB, and AB type monomeric materials and were end-capped with phenylacetylene, phenylmaleimide, or nadimide reactive end-groups. The resulting reactive end-capped liquid crystal oligomers exhibit a variety of improved and preferred physical properties. The end-capped liquid crystal oligomers are thermotropic and have, preferably, molecular weights in the range of approximately 1000–15,000 grams per mole. The end-capped liquid crystal oligomers have broad liquid crystalline melting ranges and exhibit high melt stability and very low melt viscosities at accessible temperatures. The end-capped liquid crystal oligomers are stable for up to an hour in the melt phase. These properties make the end-capped liquid crystal oligomers highly processable by a variety of melt process shape forming and blending techniques including film extrusion, fiber spinning, reactive injection molding (RIM), resin transfer molding (RTM), resin film injection (RFI), powder molding, pultrusion, injection molding, blow molding, plasma spraying and thermo-forming. Once processed and shaped, the end-capped liquid crystal oligomers were heated to further polymerize and form liquid crystalline thermosets (LCT). The fully cured products are rubbers above their glass transition temperatures. The resulting thermosets display many properties that are superior to their non-end-capped high molecular weight analogs.

3 Claims, 7 Drawing Sheets

OTHER PUBLICATIONS

Andrea E. Hoyt & Brian C. Benicewicz, "Journal of Polymer Science," Rigid Rod Molecules as Liquid Crystal Thermosets. I. Rigid Rod Amides, John Wiley & Sons, Inc., p. 3403–3415, vol. 28, (1990).

J.P. Habas, M.F. Grenier–Loustalot, & J. Peyrelasse, "High Performance Polymer," Rheological and Spectroscopic characterization of the Properties of a Prepolymer for High–Temperature Applications: the IP960 System, IOP Publishing Ltd., p. 407–426, vol. 8, (1996).

Andrea H. Hoyt & Samuel J. Huang, "American Chemical Society," Lyotropic Liquid Crystalline Oligomers for Molecular Composites, The Division of Polymer Chemistry, Inc. p. 477–478, vol. 34, No. 1, 1993.

Arthur J. Gavrin, Christine L. Curts, & Elliot P. Douglas, "Journal of Polymer Science," High–Temperature Stability of a Novel Phenylethynyl Liquid–Crystalline Thermoset, John Wiley & Sons, Inc., p. 4184–4190, vol. 37, (1999).

Werner Mormann & Christian Kuckertz, "Macromol. Chem. Phys.," Liquid Crystalline Cyanurate Thermosets Through Cyclotrimerisation of Novel Triaromatic Dicyanates, Huthig& Wepf Verlag, Zug, p. 845–851, vol. 199, (1998).

Elliot P. Douglas, David A. Langlois, & Brian C. Benicewicz, "American Chemical Society," Synthesis, Phase Behavior, and Curing Studies of Bisacetylene Rigid–Rod Thermosets, 9. 1925–1933, (1994).

Hans R. Kricheldorf, "Mol. Cryst. Liq. Cryst," Liquid–Crystalline Polyimides, Gordon and Breach Science Publishers, 87–109, vol. 254, (1994).

A.J. East, L.F.Charbonneau, & G.W. Calundann, "Thermotropic Poly(Ester–Amides) Based on Haphthalene Monomers," Mol. Cryst. Liq. Cryst., Gordon and Breach Science Publishers, p. 615–637, vol. 157, 1968.

\* cited by examiner

LIQUID CRYSTALLINE THERMOSETS FROM ESTER, ESTER-IMIDE, AND ESTER-AMIDE OLIGOMERS

This application claims the benefit of U.S. provisional application No. 60/232,504, filed Sep. 13, 2000.

ORIGIN OF THE INVENTION

This invention was made by employees of the United States Government and may be manufactured and used by or for the Government for governmental purposes without the payment of any royalties thereon or therefor.

1. Field of the Invention

The present invention relates generally to liquid crystalline polymers and liquid crystal thermosets. Specifically, the invention relates to liquid crystalline ester, ester-imide, and ester-amide oligomers and the improved physical properties of such species when they are end-capped with phenylacetylene, phenylmaleimide, or nadimide terminated monofunctional reactants. The invention also relates to the ability to process liquid crystal polymers and their use in melt process shape forming and blending techniques such as film extrusion, fiber spinning, reactive injection molding (RIM), resin transfer molding (RTM), resin film injection (RFI), powder molding, pultrusion, injection molding, blow molding, and thermo-forming.

2. Description of the Related Art

High molecular weight linear ester-based thermotropic liquid crystalline polymers (TLCPs) are known in the literature. Non-end-capped TLCP copolyesters are taught by Kuhfuss and Jackson in U.S. Pat. No. 3,778,410 and U.S. Pat. No. 3,804,805. TLCP polyesters with non-reactive phenylester and ethylester end-cap groups, that can only be thermoset at elevated temperatures via oxidative backbone crosslinking, are taught by Calundann in U.S. Pat. No. 4,067,852 and U.S. Pat. No. 4,161,470 and Calundann et al in U.S. Pat. No. 4,083,829. McCarthy et al in U.S. Pat. No. 5, 319,064 and Plotzker et al in U.S. Pat. No. 5,688,895 teach high molecular weight liquid crystalline poly(ester-amide)s, Alanko et al teach, in U.S. Pat. No. 5,843,541, high molecular weight poly(ester-imide)s, and Hisgen et al teach high molecular weight poly(ether-ester-imide)s in U.S. Pat. No. 4,762,906. The McCarthy et al, Plotzker et al, Alanko et al, and Hisgen et al patents do not teach polymers with melt viscosities in the range of approximately 1 to approximately 250 poise, and the claimed high molecular weight liquid crystalline polymers have neither reactive end-caps nor rubber characteristics above $T_g$. Kricheldorf et. al. in *Mol. Cryst. Liq. Cryst.*, 254, 87 (1994) teach other aliphatic and aromatic liquid crystalline poly(ester-imide)s, while Calundann et al teach other thermotropic poly(ester-amide)s in *Mol. Cryst. Liq. Cryst.*, 157, 615 (1988) and U.S. Pat. No. 4,351,918. All of the above materials are very difficult to melt process due to their high melt viscosities.

Improved melt processability of linear high molecular weight TLCPs was achieved by the addition of small amounts of low molecular weight organic compounds during the melt processing steps of the high molecular weight liquid crystal polymers by the teachings of Froix in U.S. Pat. No. 4,267,289 and Yoon in U.S. Pat. No. 4,581,399. Charbonneau et al in U.S. Pat. No. 4,746,694 teach liquid crystal polymers with relatively low melt viscosities (200–1000 poise at 345° C. and a shear rate of 100 radials/sec) by disrupting the linear progression of the polymer backbone. This process results in undesirable volatiles.

Thermosets have been prepared from thermotropic liquid crystalline polymers. Uryu and Kato teach, in U.S. Pat. No. 4,710,547, thermotropic liquid crystal thermosets (TLCTs) via incorporation of trifunctional cross-link units into the TLCPs in order to immobilize the anisotropic melt. Haider et al teach, in U.S. Pat. No. 5,216,073, a moldable composition by blending a liquid crystal polyester with an epoxy-functionalized rubber. In U.S. Pat. No. 4,654,412, Calundann et al teach incorporation of stilbene and tolane type difunctional monomers into the backbone of main chain wholly aromatic liquid crystalline polyesters in which cured shaped articles made of these polymers were prepared by backbone crosslinking using a maleic anhydride dipping procedure requiring an undesirable second process step.

Several patents filed by Benicewicz et al, U.S. Pat. No. 5,114,612, U.S. Pat. No. 5,198,551, U.S. Pat. No. 5,315,011, U.S. Pat. No. 5,475,133, and U.S. Pat. No. 5,575,949 and articles, A. E. Hoyt and B. C. Benicewicz, *J. Polym. Sci.: Part A: Polym. Chem.*, 28, 3417 (1990); E. P. Douglas, D. A. Langois, B. C. Benicewicz, *Chem. Mat.*, 6, 1925 (1994); W. Mormann, C. Kuckertz, *Macromol. Chem. Phys.*, 199, 845 (1998), and A. J. Gavrin, C. L. Curts, E. P. Douglas, *J. Polym. Sci.: Part A: Polym. Chem.*, 37, 4184 (1999), teach solution prepared well-defined low molecular weight pure ester and amide based TLCTs having self-reactive end-cap groups such as propargyl, ethynylphenyl, maleimide, nadimide, and methyl nadimide. The Benicewicz et al literature teaches neither oligomeric materials nor materials that are rubbers above their $T_g$. The Benicewicz et al data indicates that their compounds will have large exothermic activity during large batch productions and that their materials have very short melt process windows.

Lubowitz et al teach, in U.S. Pat. Nos. 4,661,604, 4,684, 714, U.S. Pat. No. 4,739,030, U.S. Pat. No. 4,851,501, and U.S. Pat. No. 5,550,204 self-reactive end-cap monomers to prepare oligomeric polymer resins, including polyesters. Lubowitz et al, however, do not teach using the claimed end-caps with liquid crystal oligomers. Lubowitz et al, further, teach the use of end-cap groups that will not survive the melt condensation polymerization conditions. Finally, Lubowitz et al do not teach materials with melt viscosities in the range of approximately 1 to approximately 250 poise at a shear rate of 100 radials/second.

Bilow et al teach, in U.S Pat. No. 3,864,309, polyimide oligomers end-capped with terminal acetylene or cyano groups. Bilow et al's use of the term "oligomer" is inconsistent with our present use of the tenri "oligomer." Bilow et al teach low molecular weight pure end-capped irnides as opposed to low molecular weight polyimide oligomers; the Bilow et al patent teaches end-capped backbone structures of only one unit wherein an entire sample contains only molecules of the same length and molecular weight. Bilow et al teach the use of end-cap groups that will not survive melt condensation polymerization conditions. Finally, Bilow et al teach materials that are neither liquid crystalline nor have melt viscosities in the range of approximately 1 to approximately 250 poise at a shear rate of 100 radials/second.

Reinhardt et al teach, in U.S. Pat. No. 4,513,131, phenylacetylene end-capped low molecular weight pure aryl-ethers as opposed to the polyester, poly(ester-amide), and poly(ester-imide) oligomers. Reinhardt et al teach materials that are not liquid crystals. Reinhardt et at teach pure low molecular weight polymer samples as opposed to the oligomeric mixtures.

Similarly, Sheppard et al in U.S. Pat. No. 4,851,495, Kwiatkowski et al in U.S. Pat. No. 3,839,287, Kovar et al in U.S. Pat. No. 3,975,444, Baudouin et al in U.S. Pat. No.

4,225,497, and Kumar et al in U.S. Pat. No. 4,550,177 teach materials that are not liquid crystalline. These patents also do neither teach materials with melt viscosities in the range of approximately 1 to approximately 250 poise at a shear rate of 100 radials/second nor do they teach the use of end-cap groups that will survive melt condensation polymerization conditions.

The claimed invention of reactive end-capped oligomeric liquid crystalline polyesters, poly(ester-amide)s, and poly(ester-imide) is novel and non-obvious over the prior art. The present invention was prepared via melt condensation techniques as opposed to solution chemistry and produced oligomeric mixtures as opposed to well defined pure molecular species. The present invention is oligomeric rather than pure in that they contain a mixture of varying higher weight and/or length TLCPs, relative to the pure analogs, and generally have molecular weight distributions of approximately of 1000 to approximately 15,000 grams per mole. Linking of individual oligomers in the present invention primarily occurs via reactions only between the end-cap groups rather than backbone to backbone or backbone to end-cap group crosslinking. Finally, the present invention has unexpected and improved physical and melt processing characteristics including melt viscosities in the range of approximately 1 to approximately 250 poise at a shear rate of 100 radials/second, rubber behavior above the $T_g$, exhibit no exothermiic behavior during batch production, and have melt process windows of up to an hour at approximately 300° C.

SUMMARY OF THE INVENTION

Based on what has been stated above, it is an objective of the present invention to prepare high performance end-capped liquid crystal ester, ester-imide, and ester-amide oligomers. These end-capped liquid crystal oligomers were prepared via melt condensation techniques over a wide temperature range while maintaining the liquid crystal state and properties. The end-capped liquid crystal oligomers have greatly reduced melt flow viscosities over extended periods of time, relative to other higher molecular weight analogs, allowing for melt processing. The end-cap groups were chosen to be stable in the temperature range used for the melt condensation preparation of the liquid crystal oligomers. The end-cap groups were chosen to polymerize with each other at temperatures above the range used for the melt condensation preparation of the oligomers and above that temperature which will induce chain-extension of the liquid crystal oligomers. The melt processed end-capped liquid crystal oligomers were converted into to liquid crystal thermosets by exposure to temperatures sufficiently high to cause end-cap polymerization while not inducing cross-linking of the liquid crystal backbone. The degree of end-cap polymerization was controlled through varying length and temperature of exposure.

It is another objective of the present invention to prepare high performance end-capped liquid crystal ester, ester-imide, and ester-amide oligomers that can be prepared using commercially available monomers in a relatively inexpensive and environmentally benign one vessel synthesis.

It is another objective of the present invention to prepare high performance end-capped liquid crystal ester, ester-imide, and ester-amide oligomers that are amenable to melt process shape forming and blending techniques such as film extrusion, fiber spinning, reactive injection molding (RIM), resin transfer molding (RTM), resin film injection (RFI), powder molding, pultrusion, injection molding, blow molding, plasma spraying, and thermo forming. More specifically, the objective is to prepare high performance end-capped liquid crystal ester, ester-imide, and ester-amide oligomers that are suitable for Resin Transfer Molding (RTM). The preferred oligomers have low melt viscosities, low dielectric constants, low moisture absorption, high solvent resistivity, and high adhesion and barrier properties. Most specifically, the oligomers have the above qualities and are able to be used as composite matrices, adhesives, high barrier coatings, low dielectric films, membranes, fibers, and moldings.

The "backbones" of the end-capped liquid crystalline ester, ester-imide, or ester-amide oligomers were prepared from the reaction between varying quantities and combinations of one or more aromatic, heterocyclic or aliphatic dicarboxylic acids, aromatic, heterocyclic or aliphatic diols aromatic, heterocyclic or aliphatic diamines, hydroxybenzoic acids and aminobenzoic acids. The preferred embodiments of the end-capped ester, ester-imide, and ester-amide oligomers backbones are depicted in FIG. 1, wherein R is the structural units depicted in FIG. 2 and Ar is the structural units depicted in FIG. 3 and X is the structural units depicted in FIG. 4. The "backbone" liquid crystal oligomers are simultaneously end-cap terminated with stoichiometric quantities of mono-functional reactants to control oligomer chain length. The end-cap units for the end-capped ester, ester-imide, and ester-amide oligomers can be prepared by methods in the art and include phenylacetylene derivatives of general formula (I)

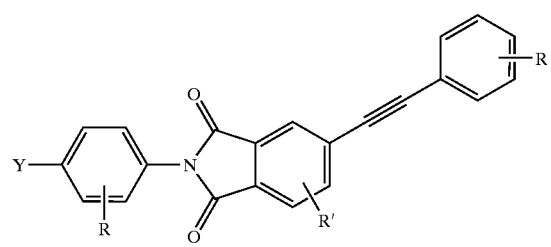

and/or phenylmaleimide of general formula (II),

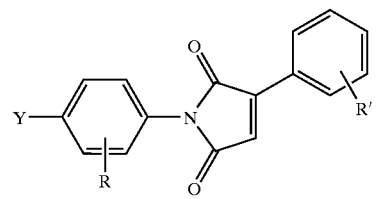

and/or nadimide of general formula (III)

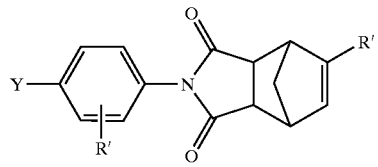

wherein Y can be a carboxy, hydroxy, amino group or any reactive analog thereof (e.g., acetoxy, propionoxy, butoxy, etc.), or an esterified carboxy group (e.g., methylbenzoate, ethylbenzoate, phenylbenzoate, etc.). The R' substituents can be identical or different on any given end-cap unit provided they do not interfere with the melt condensation synthesis of the liquid crystal oligomers or the higher temperature curing step. Possible R' substituents include hydrogen, lower alkyl groups (preferably containing four or less carbon atoms) such as methyl, ethyl, propyl, and butryl groups, aryl groups (preferably containing six to ten carbon atoms) such as phenyl or naphthyl groups, lower alkoxy groups such as methoxy, ethoxy, and propoxy, lower aryloxy groups such as phenoxy or benzloxy, or halogen groups (i.e fluoro, chloro, bromo, or iodo groups). Other phenylacetylene end-cap derivatives include 4-phenylethynyl-phenol and 4-phenylethynylbenzoic acid.

The present invention end-capped liquid crystal ester, ester-imide, and ester-amide oligomers can be modified by means of conventional additives, used in conventional amounts, of stabilizers, oxidation inhibitors, agents against thermal and ultraviolet light decomposition, lubricants, mold release agents, colorants such as dyes and pigments, fibrous or pulverulent fillers and reinforcing agents, nucleating agents, and/or plasticizers.

BRIEF DESCRIPTIONS OF THE FIGURES

FIG. 1 indicates, but does not intend to limit, the structural repeat units of the end-capped liquid crystal ester, ester-imide, and ester-amide oligomers.

FIG. 2 indicates, but does not intend to limit, the R units of the structural repeat units of the end-capped liquid crystal ester, ester-imide, and ester-amide oligomers depicted in FIG. 1.

FIG. 3 indicates, but does not intend to limit, the Ar units of the structural repeat units of the end-capped liquid crystal ester, ester-imide, and ester-amide oligomers depicted in FIG. 1.

FIG. 4 indicates, but does not intend to limit, the X units depicted in FIG. 3.

DETAILED DESCRIPTION OF THE INVENTION

Figure 1:
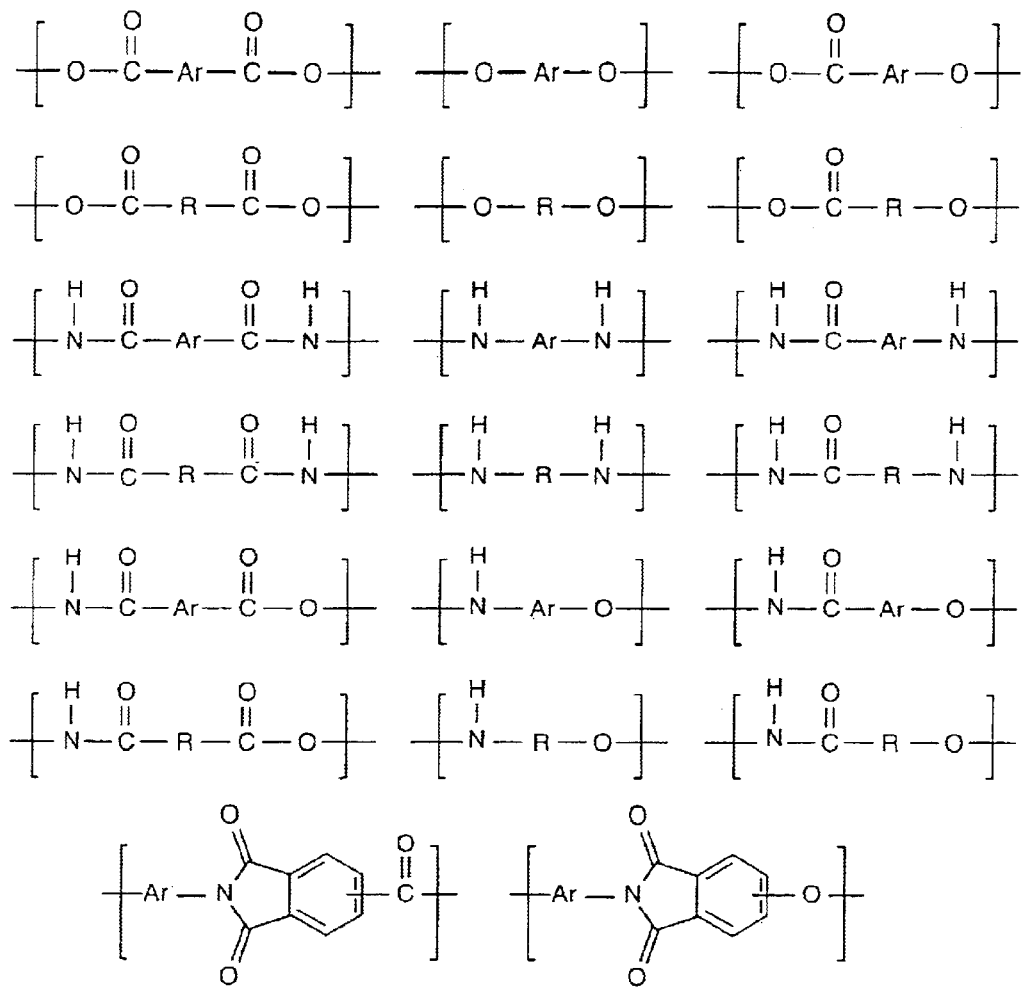

Within the scope of the present invention, the term "oligomer(s)" and "oligomer mixture(s)" designate mixtures of varying backbone length liquid crystal polymers, of maximally 500 repeat units, within the weight range of approximately 1000 to approximately 15,000 grams per mole that are not isolated as discreet molecular weight polymers.

The term "pure" designates liquid crystal compounds in which all molecules of a given sample are of the same length and molecular weight. The terms "high weight" and "high molecular weight" designate polymers and mixtures of polymers in which additional increases in polymer length and weight have no effect on the physical properties, including processability, of the polymers and mixtures.

Linear liquid crystal polymers (LCPs) exhibit higher degrees of molecular order while in the molten state than other polymeric species. The ability of these species to maintain molecular order in the molten state has pronounced effects on the solid state physical properties of this class of polymers. Specifically, liquid crystalline polymers exhibit molecular order in the solid state and lower melt viscosities at higher molecular weights. The improved molecular order in the solid state makes liquid crystal polymers desirable for uses in shape molded composite materials. Despite LCPs exhibiting reduced melt viscosities, the melt viscosities have not until now been sufficiently low to make higher weight LCPs amenable to improved melt process shape forming and blending techniques such as film extrusion, fiber spinning, reactive injection molding (RIM), resin transfer molding (RTM), resin film injection (RFI), powder molding, pultrusion, injection molding, blow molding, plasma spraying, and thermo-forming.

Linear thermotropic liquid crystals typically have very high melting points and molecular weights that limit their ability to be melt processed. Once formed, however, the polymers typically have very high melting points and molecular weights that limit their ability to be melt processed. The present invention involves the preparation of liquid crystal oligomers of relatively moderate weight and length via traditional melt state condensation techniques. The liquid crystal oligomers were end-capped in the melt state with phenylacetylene, phenylmaleimide, or nadimide terminated monofunctional reactants. These end-caps are stable in the melt state condensation conditions needed for preparing the liquid crystal oligomers. The end-caps were chosen so as to polymerize with each other at temperatures above the range used for the melt condensation preparation of the oligomers but below that which will induce cross-linking of the liquid crystal backbone.

The resulting end-capped LCTs display many superior and improved properties to their non-end-capped high molecular weight analogs that are non-obvious and unanticipated in the literature. Among these properties are: unusually lowered melt viscosities for these weight polymer species compared to non-end-capped higher molecular weight analogs and comparable and/or superior to previously end-capped lower weight non-oligomeric species (end-capped single pure molecules), stability of melt viscosities at elevated temperatures for extended periods of time relative to previous liquid crystalline products, and reduced brittleness (i.e. rubber behavior) above the glass transition temperature.

The end-capped liquid crystal oligomers exhibit lower melt viscosities than the corresponding non-end-capped high weight analogs. Being polymeric, the end-capped liquid crystal oligomers exhibit superior physical properties relative to well-defined end-capped low weight pure liquid crystal esters. This class of end-capped liquid crystal oligomers, therefore, exhibits improved melt processability relative to higher weight analogs while maintaining the benefits of being polymeric relative to well-defined end-capped low weight pure liquid crystal esters. In many instances, the lowered melt viscosity can be maintained for extended periods of time relative to the non-end-capped higher weight analogs and comparable and/or superior to the end-capped low weight pure liquid crystal esters. Lowered melt viscosities make this new class of liquid crystal polymers more amenable to melt processing. For the first time, higher weight liquid crystal oligomers can be used effectively in melt process shape forming and blending techniques.

Once melt processed and shaped, the end-capped liquid crystal oligomers were cured at elevated temperatures (temperatures above that used for the melt state condensation) resulting in liquid crystal thermosets. This second step causes the end-caps to react with one another and further increases the molecular weight of the liquid crystal polymers. Traditionally, heat curing of polymer molds is carried out at temperatures sufficiently high to induce cross-linking of the polymer backbone. Cross-linking of the backbone, however, often makes the cured product brittle. In the present invention, the reactions between the end-caps can be carried out at temperatures below that which would induce significant cross-linking within the liquid crystal oligomer backbone while the degree of end-cap polymerization can be controlled through varying length and temperature of exposure. Unexpectedly, the lack of significant backbone cross-linking produces liquid crystalline polymers that behave as rubbers when elevated above their glass transition temperatures rather than becoming brittle.

Method of Preparation

Figure 2:
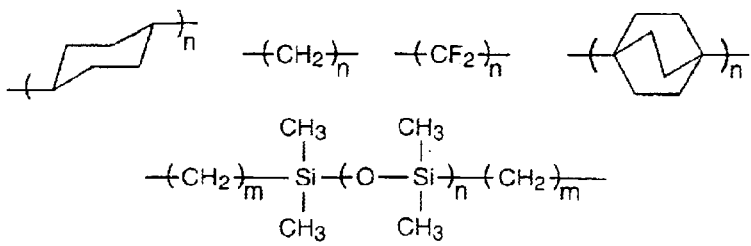
Figure 3:
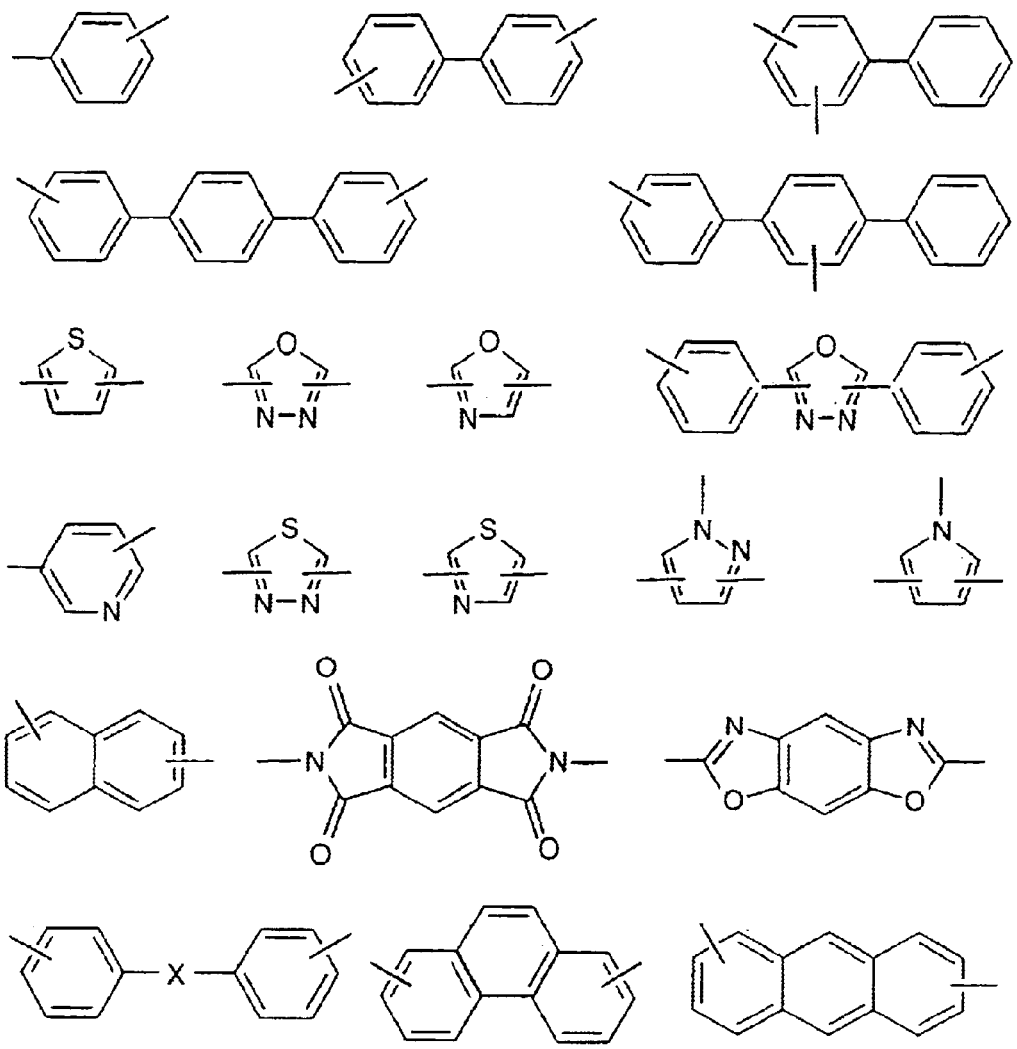
Figure 4:
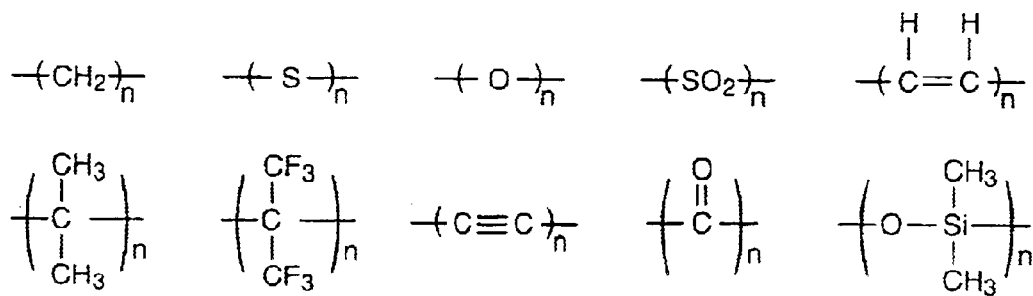
Figure 5:
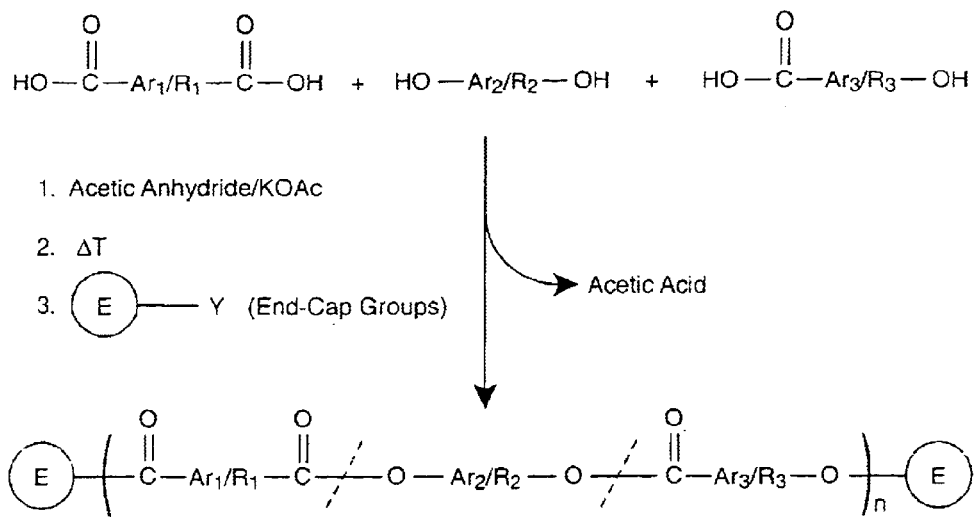
FIG. 5 is a sample reaction.
Figure 6:
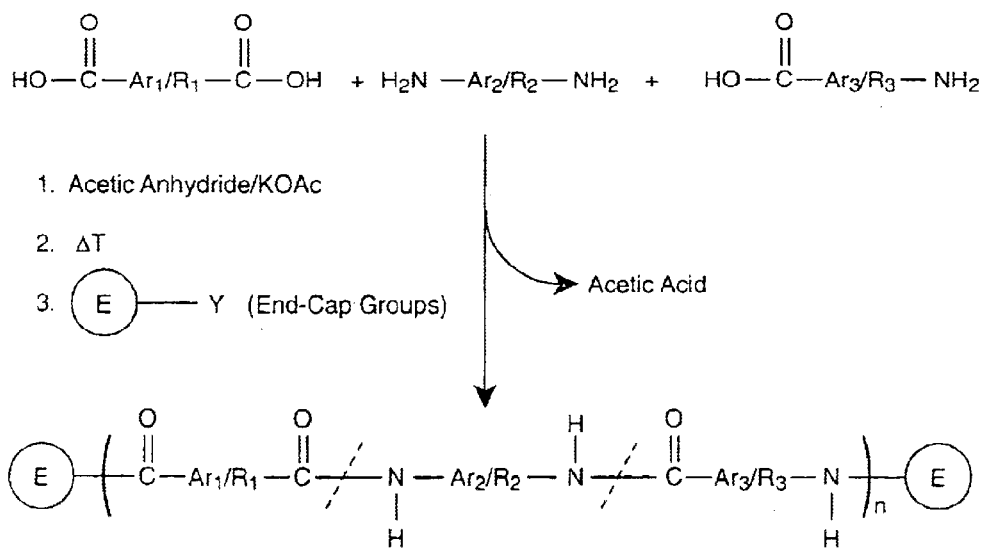
FIG. 6 is a sample reaction.
Figure 7:
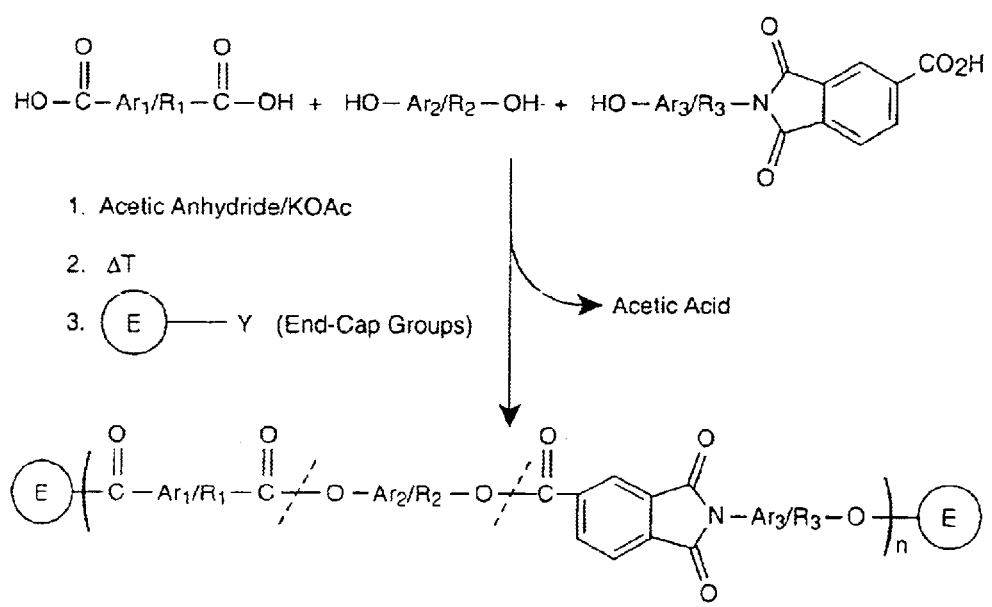
FIG. 7 is a sample reaction.

The "backbones" of the end-capped liquid crystalline ester, ester-imide, or ester-amide oligomers were prepared from the reaction between varying quantities and combinations of one or more aromatic, heterocyclic or aliphatic dicarboxylic acids, aromatic, heterocyclic or aliphatic diols aromatic, heterocyclic or aliphatic diamines, hydroxybenzoic acids and aminobenzoic acids. The preferred embodiments of the end-capped ester, ester-imide, and ester-amide oligomers backbones are depicted in FIG. 1 wherein R is the structural units depicted in FIG. 2 and Ar is the structural units depicted in FIG. 3 and X is the structural units depicted in FIG. 4. The preferred general methods of preparation of the end-capped ester, ester-imide, and ester-amide oligomers are presented in FIGS. 5, 6, and 7 wherein $R_1$, $R_2$, and $R_3$ can be identical or different and are the structural units depicted in FIG. 2 and $Ar_1$, $Ar_2$, and $Ar_3$ can be identical or different and are the structural units depicted in FIG. 3 and X is the structural units depicted in FIG. 4. E-Y represents end-cap units I, II, and/or III that can be prepared by methods available in the literature, wherein Y can be a carboxy, hydroxy, amino group or any reactive analog thereof (e.g., acetoxy, propionoxy, butoxy, etc.), or an esterified carboxy group (e.g., methylbenzoate, ethylbenzoate, phenylbenzoate, etc.) and the R' substituents can be identical or different on any given end-cap unit provided they do not interfere with the melt condensation synthesis of the liquid crystal oligomers or the higher temperature curing step. Possible R' substituents include hydrogen, lower alkyl groups (preferably containing four or less carbon atoms) such as methyl, ethyl, propyl, and butryl groups, aryl groups (preferably containing six to ten carbon atoms) such as phenyl or naphthyl groups, lower alkoxy groups such as methoxy, ethoxy, and propoxy, lower aryloxy groups such as phenoxy or benzloxy, or halogen groups (i.e fluoro, chloro, bromo, or iodo groups). The stoichiometric amounts of each reactant and end-cap group can be varied to prepare oligomers of varying size, weight, characteristic and chemical content. The reactions depicted in FIGS. 5, 6, and 7 are generally performed at between approximately 140° C. to approximately 350° C. The melt viscosities of the end-capped ester, ester-imide, and ester-amide oligomers are lower than their non-end-capped analogs.

The present invention end-capped liquid crystal ester, ester-imide, and ester-amide oligomers can be modified by means of conventional additives, used in conventional amounts, of stabilizers, oxidation inhibitors, agents against thermal and ultraviolet light decomposition, lubricants, mold release agents, colorants such as dyes and pigments, fibrous or pulverulent fillers and reinforcing agents, nucleating agents, or plasticizers.

The following specific examples are provided for illustrative purposes. These examples do not serve to limit the scope of the invention.

EXAMPLES

Preparation of Reactive End-Caps

The following examples illustrate the reaction sequence for the synthesis of the reactive end groups that were used for the preparation of end-capped ester, ester-imide, and ester-amide oligomers.

Example A

Phenylacetylene Terminated Carboxylic Acid; PE-COOH

Into a 250 mL two-neck round bottom flask equipped with a mechanical stirrer, condenser and a nitrogen gas inlet was placed 4-aminobenzoic acid (8.0 g, 58 mmol), 4phenylethynylphthalic-anhydride (14.5 g, 58 mmol) and 150 mL glacial acetic acid. This mixture was stirred at 25° C. for 1 hour after which the temperature was raised to reflux for 12 hours. The reaction mixture was cooled to 25° C. and the precipitated product was collected by filtration, washed twice with hot ethanol and dried under vacuum at 100° C. for 8 hours.

Example B

Phenylacetylene Terminated Acetoxy Phenol; PE-OAc

Into a 250 mL two-neck round bottom flask equipped with a mechanical stirrer, condenser and a nitrogen gas inlet was placed 4-aminophenol (6.3 g, 58 mmol), 4-phenylethynylphthalicanhydride (14.5 g, 58 mmol) and 200 mL glacial acetic acid. This mixture was stirred at 25° C. for 1 hour after which the temperature was raised to reflux for 12 hours. The reaction mixture was cooled to 25° C. and the precipitated product was collected by filtration, washed twice with ethanol and dried under vacuum at 50° C. for 8 hours.

The dried end-cap products were refluxed in 150 mL acetic anhydride for 5 hours. Yellow crystals precipitated upon cooling and were collected by filtration, washed with ethanol and dried under vacuum at 80° C. for 8 hours.

Other end groups were made using similar procedures. The yields and thermal analysis results (differential scanning calorimetry) of all compounds are summarized in Table 1.

TABLE 1

Yields and thermal properties of the reactive end cappers.

| Molecular Structure | Name | Yield (%) | Tm (° C.) | $\Delta H_{fus}$ (KJ.mol$^{-1}$) | Exotherm range (° C.) | $\Delta H_{exo}$ (KJ.mol$^{-1}$) |
|---|---|---|---|---|---|---|
| | PE—COOH | 92 | 347.8 | 36.21 | 363–421 | −67 |
| | PE—OAc | 93 | 236.6 | 38.71 | 340–426 | −115 |
| | PM—COOH | 92 | 261.2 | 30.2 | 311–407 | −23 |
| | PM—OAc | 94 | 155.6 | 29.3 | 302–421 | −54 |
| | NOR—COOH | 77 | 233.1 | 30.61 | 290–360 | −21 |
| | NOR—OAc | 90 | 191.4 | 27.2 | 310–388 | −32 |

Preparation of End-Capped Liquid Crystal Oligomers

Example 1

A 100 mL 3-neck round bottom flask was charged with 4-acetoxybenzoic acid (45.1 g, 0.25 mol), 6-acetoxy-2-naphtoic acid (38.4 g, 0.17 mol), PE-COOH (2.43 g, 6.6 mmol), PE-OAc (2.52 g, 6.6 mmol) and 4 mg potassium acetate. The flask was equipped with a sealed glass paddle stirrer, a nitrogen inlet tube and an insulated distillation head. The flask was purged with nitrogen gas, and the reaction mixture was heated over a 3 hour period on a woods metal bath, under a slow stream of nitrogen, with the reaction temperature being increased from 150° C. to 300° C. At this point the temperature was increased to 310° C. over 30 minutes and a vacuum was slowly applied for 25 min. The opaque melt was cooled to room temperature and the product (6HBA/4HNA-9PE) was broken from the flask and ground into a fine powder.

Example II

A 100 mL 3-neck round bottom flask was charged with 4-hydroxybenzoic acid (20.72 g, 0.15 mol), 6-hydroxy-2-naphtoic acid (18.82 g, 0.1 mol), NOR-COOH (1.13 g, 4 mmol), NOR-OAc (1.19 g, 4 mmol), acetic anhydride (28.1 g, 0.275 mol), and 5 mg potassium acetate. The flask was equipped with a sealed glass paddle stirrer, a nitrogen inlet tube and an insulated distillation head. The flask was purged with nitrogen gas, and the reaction mixture was heated over a 1 hour period on a woods metal bath, under a slow stream of nitrogen, to 140° C. and held for 1 hour at this temperature. The reaction temperature was increased to 250° C. in 100 min. and hold at this temperature for 50 min. The reaction temperature was increased from 250° C. to 275° C. in 30 min. and a vacuum was slowly applied for 20 min. The opaque melt was cooled to room temperature and the product (6HBA/4HNA-9NOR) was broken from the flask and ground into a fine powder.

Example III

A 100 mL 3-neck round bottom flask was charged with 4-hydroxybenzoic acid (20.72 g, 0.15 mol), 6-hydroxy-2-naphtoic acid (18.82 g, 0.1 mol), PM-COOH (1.17 g, 4 mmol), PM-OAc (1.23 g, 4 mmol), acetic anhydride (28.1 g, 0.275 mol), and 5 mg potassium acetate. The flask was equipped with a sealed glass paddle stirrer, a nitrogen inlet tube and an insulated distillation head. The flask was purged with nitrogen gas, and the reaction mixture was heated over a 1 hour period on a woods metal bath, under a slow stream of nitrogen to 140° C. and held for 1 hour at this temperature. The reaction temperature was increased to 250° C. in 110 min. and hold at this temperature for 50 min. The reaction temperature was increased from 250° C. to 300° C. in 30 min. and a vacuum was slowly applied for 20 min. The opaque melt was cooled to room temperature and the product (6HBA/4HNA-9PM) was broken from the flask and ground into a fine powder.

Example IV

A 100 mL 3-neck round bottom flask was charged with 4-acetoxybenzoic acid (19.8 g, 0.11 mol), 6-acetoxy-2-naphtoic acid (2.3 g, 0.01 mol), 2,6-diacetoxynaphthalene (9.77 g, 0.04 mol), terephthalic acid (6.65 g, 0.04 mol), PE-COOH (1.17 g, 3.2 mmol), PE-OAc (2.21 g, 3.2 mmol) and 4 mg potassium acetate. The flask was equipped with a sealed glass paddle stirrer, a nitrogen inlet tube and an insulated distillation head. The flask was purged with nitrogen gas, and the reaction mixture was heated over a 3 hour period on a woods metal bath, under a slow stream of nitrogen, with the reaction temperature being increased from 150° C. to 300° C. After three hours, vacuum was slowly applied for 25 min. The opaque melt was cooled to room temperature and the product (55HBA/20TA/5HNA/20ND-9PE) was broken from the flask and ground into a fine powder.

Example V

A 100 mL 3-neck round bottom flask was charged with terephthalic acid (8.31 g, 0.05 mol), ethylene bis(4-hydroxybenzoate) (13.33 g, 0.044 mol), 4-acetoxyphenylethynyl (2.77 g, 0.012 mol), and 4 mg potassium acetate. The flask was equipped with a sealed glass paddle stirrer, a nitrogen inlet tube and an insulated distillation head. The flask was purged with nitrogen gas, and the reaction mixture was heated over a 3 hour period on a woods metal bath, under a slow stream of nitrogen, with the reaction temperature being increased from 150° C. to 260° C. After three hours the temperature was increased to 280° C. over 30 minutes and a vacuum was slowly applied for 15 min. The opaque melt was cooled to room temperature and the product (50TA/25HBA/25EG-5APE) was broken from the flask and ground into a fine powder.

Example VI

A 100 mL 3-neck round bottom flask was charged with 6-acetoxy-2-naphtoic acid (11.51 g, 0.05 mol), terephthalic acid (2.77 g, 0.017 mol), 4-acetoxyacetanilide (3.22 g, 0.017 mol), PE-COOH (0.49 g, 1.3 mmol), PE-OAc (0.5 g, 1.3 mmol) and 3 mg potassium acetate. The flask was equipped with a sealed glass paddle stirrer, a nitrogen inlet tube and an insulated distillation head. The flask was purged with nitrogen gas, and the reaction mixture was heated over a 3 hour period on a woods metal bath, under a slow stream of nitrogen, with the reaction temperature being increased from 150° C. to 300° C. After three hours a vacuum was slowly applied for 25 min. The opaque melt was cooled to room temperature and the product (6HNA/2TA/2AP-9PE) was broken from the flask and ground into a fine powder.

Example VII

A 100 mL 3-neck round bottom flask was charged with terephthalic acid (7.62 g, 0.046 mol), ethylene bis(4-acetoxyanilide) (18.85 g, 0.049 mol), PE-COOH (2.32 g, 6.3 mmol), and 4 mg potassium acetate. The flask was equipped with a sealed glass paddle stirrer, a nitrogen inlet tube and an insulated distillation head. The flask was purged with nitrogen gas, and the reaction mixture was heated over a 3 hour period on a woods metal bath, under a slow stream of nitrogen, with the reaction temperature being increased from 150° C. to 300° C. At this point the temperature was increased to 310° C. over 30 minutes and a vacuum was slowly applied for 15 min. The opaque melt solidified and was cooled to room temperature. The product (50TA/25AB/25EG-9PE) was broken from the flask and ground into a fine powder.

Example VIII

A 100 mL 3-neck round bottom flask was charged with 4-acetoxybenzoic acid (10.81 g, 0.06 mol), N-(3'-acetoxyphenyl)trimellitimide (11.33 g, 0.4 mol), PE-COOH (0.58 g, 1.6 mmol), PE-OAc (0.61 g, 1.6 mmol) and 2 mg potassium acetate. The flask was equipped with a sealed glass paddle stirrer, a nitrogen inlet tube and an insulated distillation head. The flask was purged with nitrogen gas, and the reaction mixture was heated over an 3 hour period on a woods metal bath, under a slow stream of nitrogen, with the reaction temperature being increased from 150° C. to 300° C. At this point the temperature was increased to 310° C. and a vacuum was slowly applied for 20 min. The opaque melt was cooled to room temperature and the product (6HBA/4IM-9PE) was broken from the flask and ground into a fine powder.

Characterization of End-Capped Liquid Crystal Oligomers

The end-capped liquid crystal oligomers were characterized using melt rheology, thermogravimetric analysis (TGA) and differential scanning calormetry (DSC). All results are summarized in Tables 2 and 3.

TABLE 2

Optical microscopy and melt rheology results.

| Example | Name | Phase Behavior at 250° C. | Phase type after 1 h. hold at 370° C. | (η(P) at 100 rad.s$^{-1}$)/ T (° C.) for 1 h. |
|---|---|---|---|---|
| | 6HBA/4HNA | N | N | (1E5-9E5)/250 |
| | 6HBA/4HNA-1PE | N | N | (200-900)/250 |
| | 6HBA/4HNA-5PE | N | N | (30-9)/250 |
| I | 6HBA/4HNA-9PE | N | N | (30-3)/250 |
| | 6HBA/4HNA-13PE | N | N | (4E4-1E5)/250 |
| II | 6HBA/4HNA-9NOR | N | N | (5E3-1E4)/250 |
| III | 6HBA/4HNA-9PM | N | N | — |
| IV | 55HBA/20TA/5HNA/20ND-9PE | N | N | (150)/250 (2)/280 |
| V | 50TA/25HBA/25EG-5APE | N | I | (2)/250 |
| VI | 6HNA/2TA/2AP-9PE | N | N | (30)/250 (9)/280 |
| VII | 50TA/25AB/25EG-9PE | N | N | — |
| VIII | 6HBA/4IM-9PE | N | N | — |

N = nematic
I = isotropic

TABLE 3

Thermal properties of the LC oligomers.

| Example | Name | 5% wt. loss in N$_2$ (° C.) | 5% wt. loss in air (° C.) | Tg (° C.) Heat 1 | Tm (° C.) Heat 1 | Tg (° C.) Heat 2 | Tm (° C.) Heat 2 |
|---|---|---|---|---|---|---|---|
| | 6HBA/4HNA | 414 | 401 | 91 | — | 91 | — |
| | 6HBA/4HNA-1PE | 431 | 411 | 100 | 205 | — | — |
| | 6HBA/4HNA-5PE | 458 | 454 | 85 | — | — | — |
| I | 6HBA/4HNA-9PE | 454 | 449 | 80 | — | 84 | — |
| | 6HBA/4HNA-13PE | 409 | 393 | — | 245 | — | — |
| II | 6HBA/4HNA-9NOR | 433 | 401 | — | — | — | — |
| III | 6HBA/4HNA-9PM | 394 | 361 | — | — | — | — |
| IV | 55HBA/20TA/5HNA/20ND-9PE | 438 | 400 | — | — | 231 | — |
| V | 50TA/25HBA/25EG-5APE | 368 | 333 | 56 | 185 | 65 | — |
| VI | 6HNA/2TA/2AP-9PE | 427 | 400 | — | — | 139 | — |
| VII | 50TA/25AB/25EG-9PE | | | | | | |
| VII | 6HBA/4IM-9PE | 385 | 408 | 138 | 317 | 210 | 294 |

Note: The heating rate for TGA experiments was 2.5° C. min$^{-1}$ and a heating rate of 10° C. min$^{-1}$ was used for the DSC experiments. The TGA samples were cured at 350° C. for 1 h. prior to the measurement. The DSC samples were heated to 350° C. and hold for 1 h. prior to the second heat.

Melt Processing Examples of End-Capped Liquid Crystal Oligomers

Thin films were prepared by heating 7HBA/3HNA 9PE, heated with 10° C./min. to 370° C. and were held at this temperature for 1 hour to allow the reactive end groups to react. The norbomene and phenylmaleimide end groups react at temperatures between 250° C. and 400° C. The phenylacetylene end groups are more stable in the melt and no significant end group chemistry could be observed below 310° C., i.e. no increase in melt viscosity could be observed.

With exception of the ester oligomers with aliphatic spacers, all oligomers formed films that did not flow under stress and appeared nematic in nature after curing. Films that have a low concentration of reactive end groups behave more elastic above their T$_g$, while the films with high concentrations of reactive end groups are more brittle in nature. Isotropization temperatures could not be observed for the wholly aromatic oligomer series. Mechanical test data are shown in Tables 4 and 5.

TABLE 4

Film tensile test results at room temperature

| 7HBA/3HNA-9PE | Strain at break (%) | Modulus (GPa) | Yield stress (MPa) |
|---|---|---|---|
| mean | 2.635 | 2.700 | 55.187 |
| Std. dev. | 0.088 | 0.144 | 2.760 |

TABLE 5

Film 3-point bending test results (ASTM D790) at room temperature

| 7HBA/3HNA-9PE | Strain at peak (%) | Modulus (GPa) | Max stress (MPa) |
|---|---|---|---|
| mean | 3.215 | 3.925 | 91.5 |
| Std. dev. | 0.757 | 0.409 | 10.0 |

Example IX

Composite Laminate Film

Figure 8:
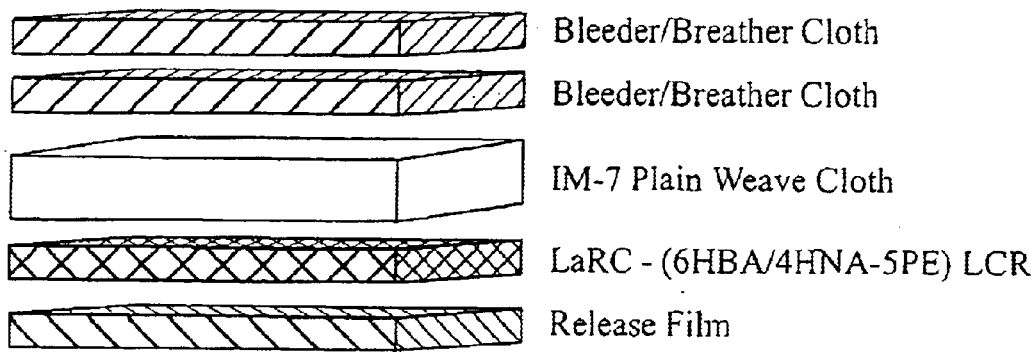
FIG. 8 is a composite laminate lay-up configuration of the end-capped liquid crystal oligomers.
Figure 9:
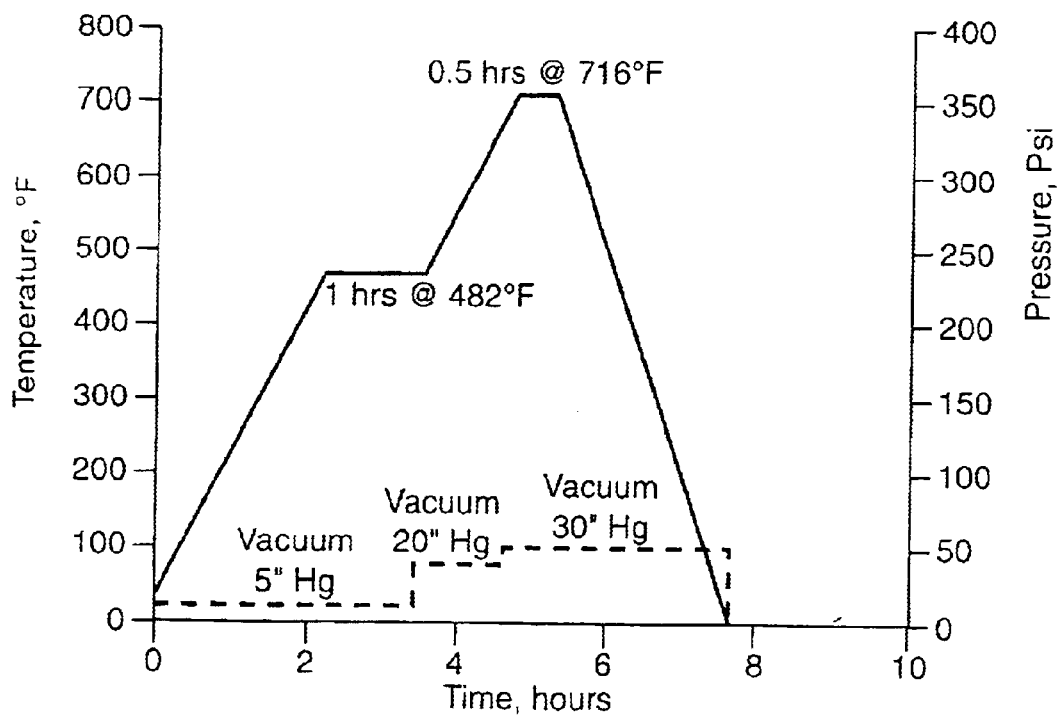
FIG. 9 is schematic of the cure cycle for the melt processing of 6HBA/4HNA-5PE into laminate graphite cloth ((6HBA/4HNA-5PE)/IM-7).

One ply of kapton film was placed on a metal plate and 25 grams of (6HBA/4HNA-5PE) was spread evenly on top of the kapton film. Four plies of plain weave IM-7 graphite cloth was placed above the powder, followed by two plies of 0.0025" Teflon bleeder/breather cloth. FIG. 8 is a composite laminate lay-up configuration of the end-capped liquid crystal oligomers. The entire lay-up was contained in a metal dam and was vacuum bagged utilizing a standard vacuum bagging process for high temperature polyimides. The (6HBA/4HNA-5PE)/IM-7 cloth was heated to 482° F. with 5" Hg of vacuum and held for one hour. During the hour hold, the viscosity of the resin decreased and was forced up through the plain weave cloth via the 5" Hg of vacuum. After 60 minutes at 482° F., the vacuum was increased to 20" Hg and the temperature was ramped to the final cure temperature of 700° F. As the temperature reached 600° F., full vacuum was applied (30" Hg) to allow increased consolidation pressure and to ensure resin infusion into the IM-7 fibers. When the final hold temperature was reached (700° F.) the part was held for 30 minutes to allow the reactive end groups (PE) to react and then the laminate was cooled to ambient temperature while maintaining full vacuum. At ambient temperature, the mold was removed from the vacuum bag and the laminate was removed from the metal dam. FIG. 9 is schematic of the cure cycle for the melt processing of 6HBA/4HNA-5PE into laminate graphite cloth ((6HBA/4HNA-5PE)/IM-7). Upon visual and ultrasonic examination, the laminate was determined to be of good quality. This result indicates that the low zero shear melt-viscosity of the thermotropic LC precursors leads to excellent wet-out of the carbon fiber reinforcement.

Example X

Figure 10:
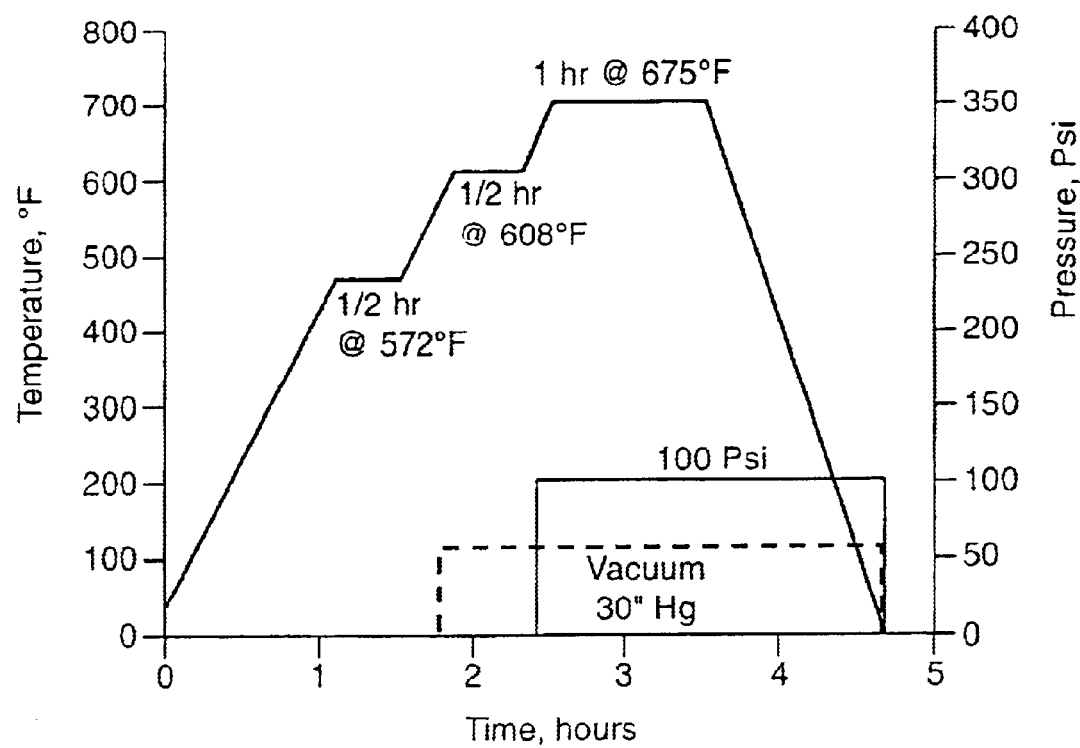
FIG. 10 is a schematic for the cure cycle for the melt processing of 6HBA/4HNA-9PE into a neat resin plaque ((6HBA/4HNA-9PE).
Figure 11:
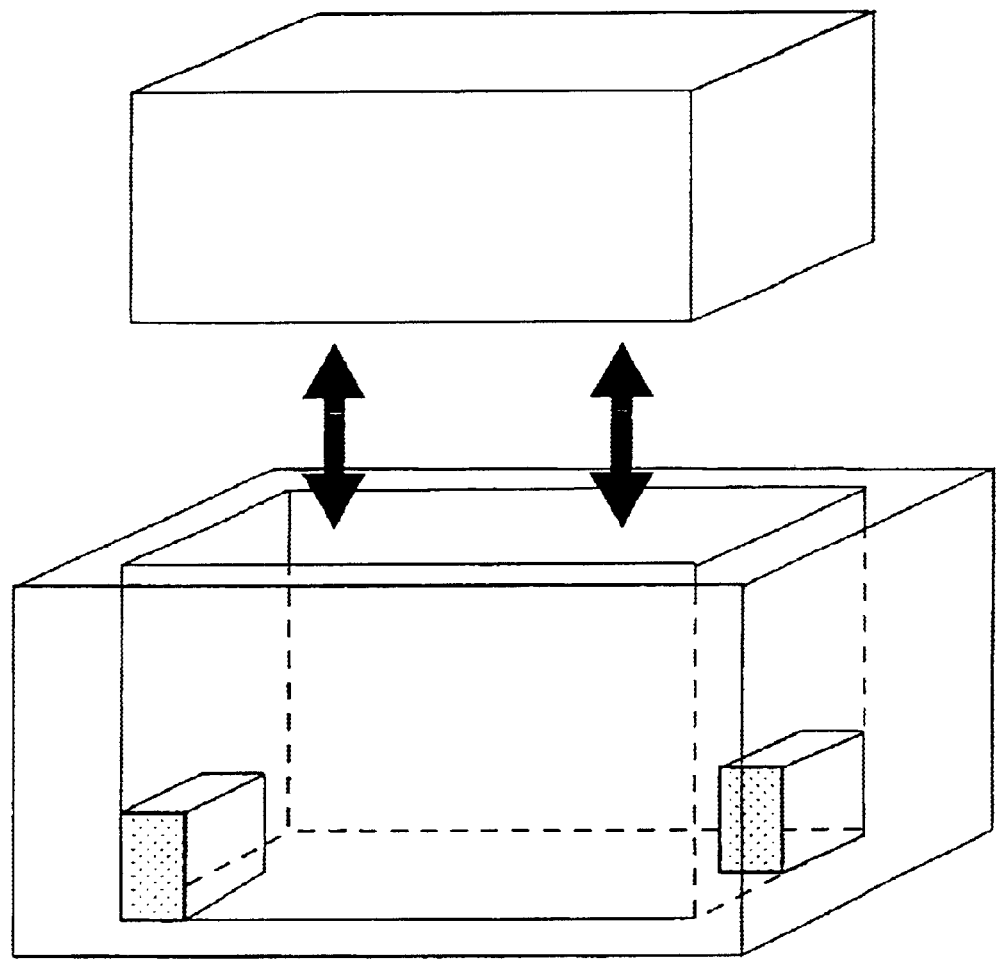
FIG. 11 is the mold configuration for the fabrication of a (6HBA/4HNA-9PE) plaque.

Resin Plaque (6HBA/4HNA-9PE) was fabricated into a neat resin plaque by the process shown in FIG. 10. The neat resin plaques were fabricated in order to test mechanical properties such as; K1C (opening mode fracture toughness), flexure strength and modulus, and compressive strength and modulus. A conceptual drawing of the mold that was used to fabricate the neat resin plaques is depicted in FIG. 11. The mold was 3.5"×3.5" and was restricted to a maximum height of 0.5". The height was restricted by placing steel spacers in the mold to ensure the final dimensions of the plaque were at least 3"×3"×0.5". Two steel spacers with dimension, 1.5"×0.25"×0.5", were placed in the mold. A piece of Kapton film was placed into the base of the mold and onto the film was poured 100 grams of (6HBA/4HNA-9PE). This material was compacted in a hydraulic press and another piece of Kapton film and the steel plunger were inserted into the mold. The entire mold was placed in a vacuum hydraulic press. The (6HBA/4HNA-9PE) was heated to 572° F. with no pressure or vacuum and held for 30 min. During this hold, the (6HBA/4HNA-9PE) began to react which was evident by a increase in viscosity and the production of acetic acid. After 30 min. at 572° F., the temperature was increased to 608° F. and 30" Hg of vacuum was applied. The polymer was held at 608° F. for 30 min. and the temperature was increased to its final holding temperature of 675° F. As the temperature approached 675° F., pressure (100 psi) was applied. The plaque was held at 675° F. for 1 hour and was cooled to room temperature under full vacuum and pressure. The plaque was removed from the mold and visual inspection indicated a well consolidated neat resin plaque with a density of 0.86 g/cm³.

Example XI

Foam Structure

A foamed structure was fabricated by using (6HBA/4HNA-9PE) that was not fully polymerized. The process was the same as described in Example X. During the high temperature vacuum step the released acetic acid acts as a blowing agent and a plaque was obtained that has a well defined porous density (0.43 g/cm³) and shows good mechanical properties.

Example XII

Adhesive Resin

To test adhesive bonding, an adhesive scrim cloth was saturated with molten (6HBA/4HNA-9PE) at 280° C. The resulting cloth contained 28 wt % resin and was placed between two titanium coupons to form a lap joint with a surface area of 2.54×1.27 cm (1×0.5 inch). The titanium coupons were sand blasted, treated with Pasa-Gel 107, washed, and dried prior to use. The lap joints were bonded in a heated press for 1 h. at 350° C. and 15 psi. The resulting bonded lap joints were tested at room temperature according to ASTM D 1002. The results are summarized in Table 6.

TABLE 6

Shear strength of (6HBA/4HNA-9PE) on titanium (Ti, 6A1-4V) at room temperature.

| Sample Set | Bond Press MPa (psi) | Bondline μm (mils) | Area of overlap (inch²) | Length of overlap (inch) | Shear Str. (psi) |
|---|---|---|---|---|---|
| 1 | 0.1 (15) | 28 (1.1) | 0.5 | 0.5 | 1998 |
| 2 | 0.1 (15) | 20 (0.8) | 0.5 | 0.5 | 1863 |

We claim:
1. An oligomer mixture with self-reactive end-caps comprising the general structure

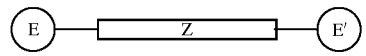

wherein
E and E' are

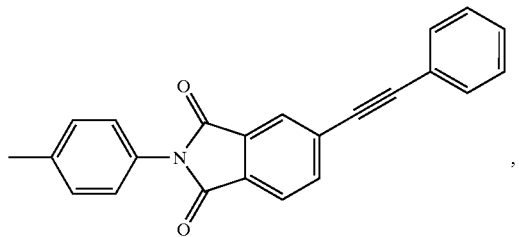

Z is

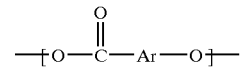

wherein Ar is

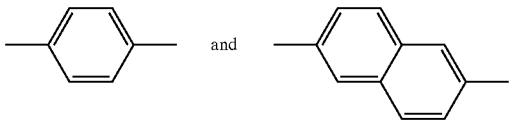

2. An oligomer mixture with self-reactive end-caps comprising the general structure

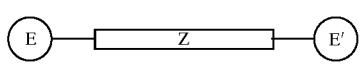
wherein
E and E' are
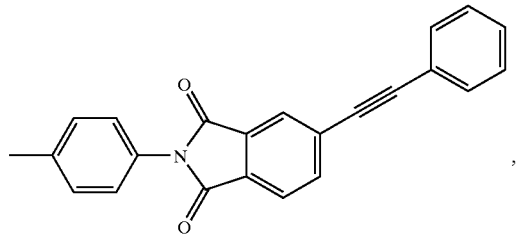
,
Z is
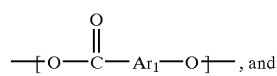
, and
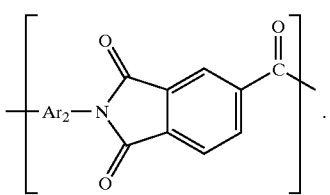
.
wherein $Ar_1$ and $Ar_2$ are
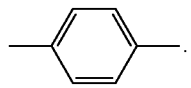
.
3. An oligomer mixture with self-reactive end-caps comprising the general structure
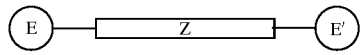
wherein
 E and E' are
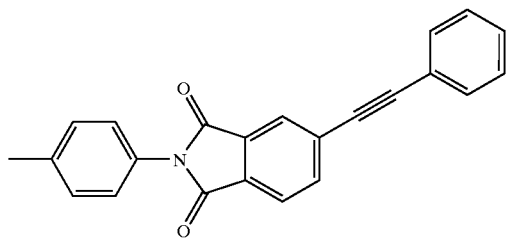
,
and Z is selected from the group consisting of
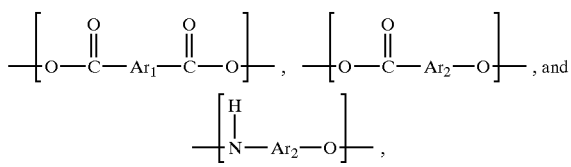
, and
where $Ar_1$ and $Ar_3$ are
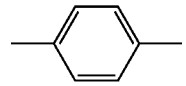
and $Ar_2$ is
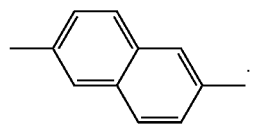
.
* * * * *